US007621440B2

(12) United States Patent
Nakamura et al.

(10) Patent No.: US 7,621,440 B2
(45) Date of Patent: Nov. 24, 2009

(54) PAPER SHEET IDENTIFIER DEVICE

(75) Inventors: Toshiaki Nakamura, Hitachinaka (JP); Toshiro Uemura, Nisshin (JP); Eiji Mizuno, Owariasahi (JP); Tatsuhiko Kagehiro, Kokubunji (JP); Masaki Ban, Seto (JP)

(73) Assignees: Hitachi Asahi Electronics Co., Ltd., Aichi (JP); Hitachi-Omron Terminal Solutions Corp., Tokyo (JP)

( * ) Notice: Subject to any disclaimer, the term of this patent is extended or adjusted under 35 U.S.C. 154(b) by 704 days.

(21) Appl. No.: 10/921,334

(22) Filed: Aug. 19, 2004

(65) Prior Publication Data

US 2005/0201609 A1 Sep. 15, 2005

(30) Foreign Application Priority Data

Mar. 11, 2004 (JP) ............................ 2004-068304

(51) Int. Cl.
*G06K 5/00* (2006.01)

(52) U.S. Cl. ...................................... 235/375; 235/454

(58) Field of Classification Search ................. 235/375, 235/379, 385, 454
See application file for complete search history.

(56) References Cited

U.S. PATENT DOCUMENTS 4,091,271 A 5/1978 Jones
5,416,307 A 5/1995 Danek
6,101,266 A * 8/2000 Laskowski et al. .......... 382/135
6,172,745 B1 * 1/2001 Voser et al. .................... 356/71
6,519,351 B2 * 2/2003 Kimura et al. .............. 382/100
6,774,986 B2 * 8/2004 Laskowski ..................... 356/71
6,804,376 B2 * 10/2004 Rhoads et al. .............. 382/100
2003/0192766 A1 10/2003 Blasher

FOREIGN PATENT DOCUMENTS

GB 1385181 2/1975

* cited by examiner

*Primary Examiner*—Daniel St.Cyr
(74) *Attorney, Agent, or Firm*—Antonelli, Terry, Stout & Kraus, LLP.

(57) ABSTRACT

The type and number of denomination of notes and the identification method of authentic notes differs for every country. The development of such identification device for these currencies in each country increases the manufacturing cost, and the processing time increases when the types of notes to be authenticated are increased. The present invention provides a paper sheet identifier device, which includes a main board for operating common processes independent from specific notes and sub-boards in parallel operation, allowing sub-boards connected to the main board to be added or replaced in accordance with the type and number of denomination of notes in a country along with the authentication method. The present invention improves the processing speed by parallelizing the identification processes, and the efficiency of updating the device specification when a new note is issued.

11 Claims, 5 Drawing Sheets

PAPER SHEET IDENTIFIER DEVICE

FIELD OF THE INVENTION

The present invention relates to a paper sheet identifier device for valuable stocks and bonds, and paper notes.

BACKGROUND OF THE INVENTION

There have been devised devices for image processing using a plurality of CPUs, one typical example is (disclosed in the patent document 1 cited below) the device having a DMA transfer circuit between the image processor and a plurality of CPUs to interrupt the signal processing in the CPUs to transfer image data to their respective RAM. The technology cited here uses the DMA transfer, instead of CPU, to transfer data to RAMs, thus the data to be transferred is the data having further image processing performed on the output of the image processor, resulting in problems that the selective transfer of effective image data is difficult, and that the high speed processing with less amount of memory is quite difficult.

There has been disclosed another approach (in the patent document 2 cited below), in which the command interpreter and address translator are inserted between a host and parallel processors so as for the processor and local memory in each of parallel processors are controlled by the CPU in the host. This technology requires the data transfer control between the processor and local memory in the parallel processors by the CPU in the host, resulting in a difficulty of parallel image processing independent among a plurality of processors including the host's CPU.

Reference 1: JP-A-2001-266137 Reference 2: JP-A-324588

SUMMARY OF THE INVENTION

The present invention has been made in view of the above circumstances and has an object to overcome the above problems and to provide a paper sheet identifier device, which allows a high speed processing in the identification of paper sheets including stocks and bonds as well as paper currencies, in addition to rapid accommodation to newly issued paper sheets.

More specifically, the present invention provides a paper sheet identifier device including: a sensor for detecting any necessary characteristics of a paper sheet required for identifying the paper sheet; a characteristics information collector unit for converting the output signal from the sensor to the characteristics information of the paper sheet; an identifying unit for identifying the paper sheet by using the characteristics information output from the characteristics information collector unit; and a controller unit for controlling the characteristics information collector unit and the identifying unit, in which the controller unit adjusts the number of connections to the identifying unit and the characteristics information collector unit, depending on the type of paper sheets or the speed of identifying process.

In accordance with one aspect, the present invention provides a paper sheet identifier device embodying the improvement of identification speed by virtue of the parallel implementation of identification processes, along with the improvement of efficiency when changing the specification of paper sheet identifier device in correspondence with the new currency notes issued.

The above and further objects and novel features of the present invention will more fully appear from following detailed description when the same is read in connection with the accompanying drawings. It is to be expressly understood, however, that the drawings are for the purpose of illustration only and not intended as a definition of the limits of the present invention.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

DETAILED DESCRIPTION OF THE PREFERRED EMBODIMENTS

The type and denomination of notes and the identification method of authentic notes differs for every country. The preferred embodiment of the present invention accordingly provides a main board for performing common processes of currency notes that is independent of country specific method (i.e., identification preprocessing and final determination), and auxiliary boards operated in parallel (for identification and sensor control). The hardware configuration can be altered to suit the note identification requirement of each country by simply adding or replacing the auxiliary boards connected to the main board.

A detailed description of one preferred embodiment embodying the present invention will now be given referring to the accompanying drawings. It should be noted here that the present invention is not to be limited to the embodiments disclosed hereinbelow.

Figure 1:
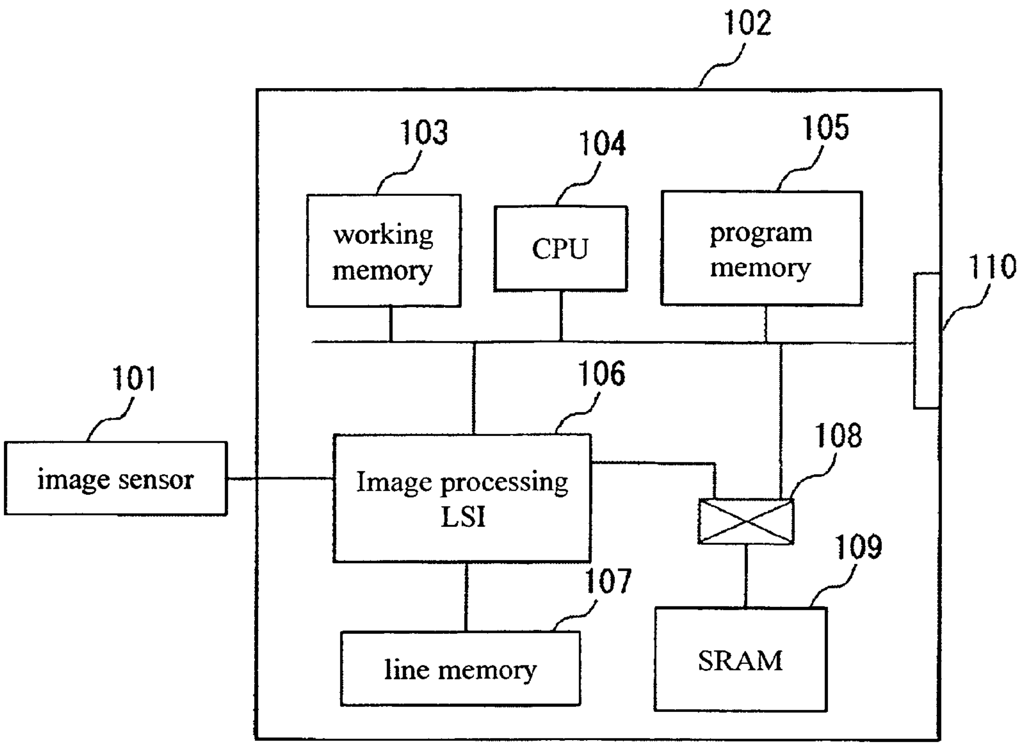
FIG. 1 is a schematic diagram illustrating the configuration of a main board in accordance with the preferred embodiment of the present invention.

Now referring to FIG. 1, there is shown a schematic circuit diagram of the main board used in the identification device in accordance with one preferred embodiment of the present invention.

An image sensor 101 is a means for outputting sequentially image signal of cross feed lines of a currency note, which means can be implemented by a CCD image sensor having a plurality of semiconductor photoelectric transducer elements placed inline. A main board 102 is an electronics board for mounting elements for performing the identification process of currency notes. A working memory 103 used by a CPU 104 for performing image processing, stores the image data of the note output from the image sensor 101, which memory can be implemented by the semiconductor memory. A program memory 105 is a memory for storing the program used for the identification process, and can be implemented by the semiconductor memory. An image processing LSI 106 is a means for converting the image signal of currency note scanned by the image sensor 101 into the image data suitable for the identification process, which LSI can be implemented by a semiconductor integrated circuit. A line memory 107 is a means for storing image data of several scan lines of cross feed direction used by the image processing LSI 106 for the image processing, which memory can be implemented by the semiconductor memory. A switch 108 is a switching means for switching the access to an SRAM 109 from either the CPU 104 or the image processing LSI 106, which switch can be implemented by a semiconductor analog switch. The SRAM 109 is a temporary storage means of the result of image processing of the surface of notes processed by the image processing LSI 106, which SRAM can be implemented by a semiconductor memory. A connector 110 is a means for connecting a system bus to other boards. The connector will be described in greater details later.

The operation of the main board 102 will be described with reference to FIG. 1. The surface image of a currency note is imaged by the image sensor 101 to obtain image signal for each line of cross feed direction. When the image sensor 101 outputs one scan line of the image signal, the image processing LSI 106 temporarily stores the image data for the scan line into the line memory 107 and performing the image processing by reading out a plurality of lines of image data. A typical image processing includes filter operation such as smoothing and edge enhancement, and gradation conversion such as binarization. The image processing results from the image processing LSI 106 is stored in the SRAM 109 through the switch 108, one scan line at a time. When the last pixel data of one scan line is stored, the image processing LSI 106 issues to the CPU 104 an image processing termination interrupt signal. The CPU 104 upon reception of the interrupt signal reads out the image processing results from the SRAM 109 through the switch 108, to transfer the image to the working memory 103. When the image transfer is completed, the CPU 104 performs data generation for identification until the image processing termination interrupt signal for the next scan line is issued from the image processing LSI 106.

Figure 2:
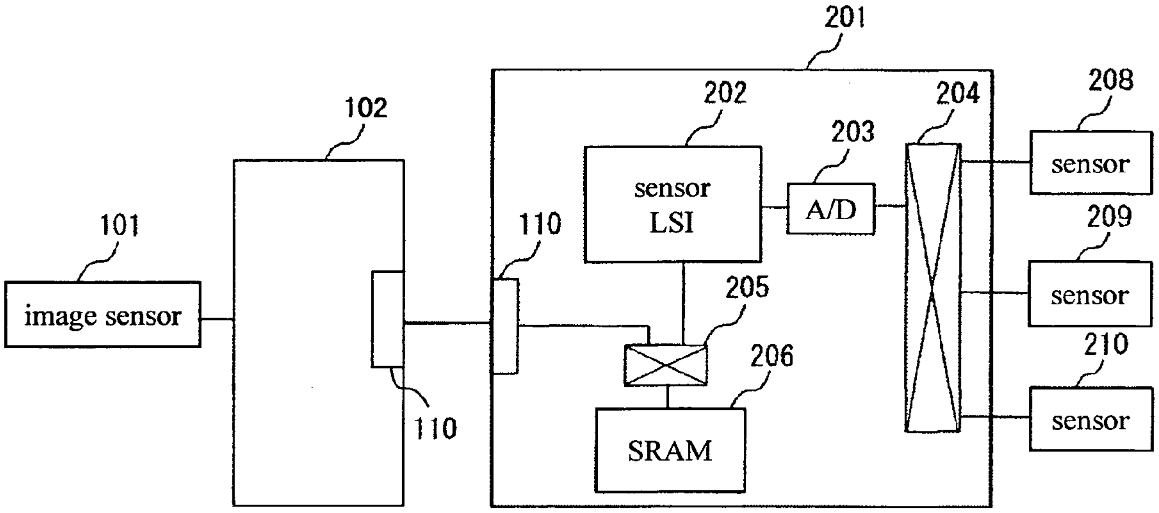
FIG. 2 is a schematic diagram illustrating the configuration of a sensor board in accordance with the preferred embodiment of the present invention.

Now referring to FIG. 2, there is shown a schematic diagram of a sensor board 201 connected to the main board 102. Sensors 208, 209, 210 are provided for detecting characteristics of a note. The characteristics of a currency note include for example the watermark, hologram, fluorescent ink and the like, in order to prevent counterfeit. The sensors 208, 209, 210 detect these characteristics. An analog switch 204 is a switching means for sequentially switching the analog signal input from the sensors 208, 209, 210 to an A/D Converter 203, which switch can be implemented by a semiconductor analog switch. The A/D Converter 203 is a means for converting the analog signal from the sensors 208, 209, 210 into the digital signal, which converter can be implemented by a semiconductor A/D converter. A sensor LSI 202 controls the operation of the sensors 208, 209, and 210, performs digital operation such as averaging between two adjacent data units on the data of the sensors 208, 209, 210 input through the A/D Converter 203, and outputs to an SRAM 206, which LSI can be implemented by a semiconductor logic LSI. An analog switch 205 is a means for switching the access to the SRAM 206 from either the CPU 104 of the main board or the sensor LSI 202, which switch can be implemented by a semiconductor analog switch. The SRAM 206 is a means for storing the sensor data for just one sheet of currency note from the sensor LSI 202, which SRAM can be implemented by a semiconductor memory capable of reading and writing data.

The operation of the sensor board 201 will be described in greater details with reference to FIG. 2. The analog signal presenting the characteristics of a currency note, detected by the sensors 208, 209, and 210, is output to the A/D converter 203 by switching the output timing on the time domain axis, for example by switching with the analog switch 204 the sequence of the sensors 208, 209, and 210. The A/D converter 203 converts the analog signal into the digital signal to feed to the sensor LSI 202, which performs the digital operation thereon separately for the sensor output. Then the analog switch 205 connects the SRAM 206 to the sensor LSI 202 to store the data processed by the sensor LSI 202 into addresses in the SRAM 206 specified for the data.

In this embodiment, the main board 102 and the sensor board 201 are separately configured. However, these two boards can be integrated into one single board.

Figure 3:
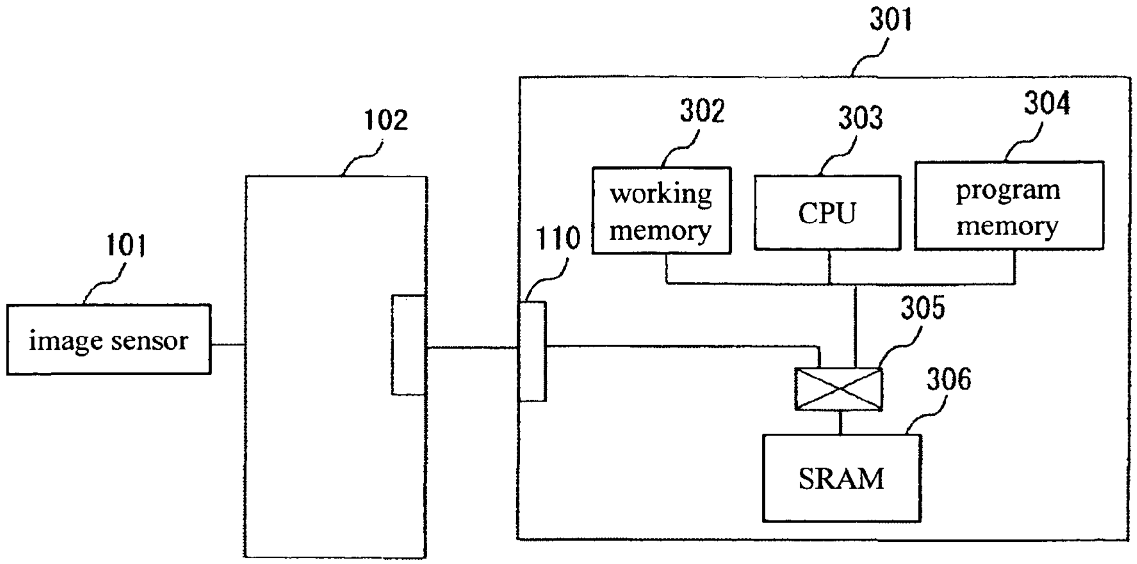
FIG. 3 is a schematic diagram illustrating the configuration of an identification board in accordance with the preferred embodiment of the present invention.

Now referring to FIG. 3, there is shown a schematic diagram of an identification board 301 connected to the main board 102. A working memory 302 is a memory for data storage for a CPU 303 to perform an identification processing, which memory can be implemented by a semiconductor memory. The CPU 303 performs the identification processing. A program memory 304 is a memory for storing the identification processing program, which memory can be implemented by a semiconductor memory. A switch 305 is a switching means for switching the access to an SRAM 306 from either the CPU 104 on the main board 102 or the CPU 303 on the identification board 301, which switch can be implemented by a semiconductor analog switch. The SRAM 306 is a memory for storing the note data for identification transferred from the CPU 104 on the main board 102, which SRAM can be implemented by a semiconductor memory.

The operation of the identification board 301 will be described with reference to FIG. 3. When the data of one scan line for identification has been stored into the SRAM 306 from the CPU 104 on the main board 102, the switch 305 switches the connection to the CPU 303. The CPU 303 reads the data for identification from the SRAM 306 to store it in the working memory 302. This operation for one scan line is iteratively repeated for one currency note before the CPU 303 performs the identification processing. The identification result information obtained by the identification processing will be stored in the specified address in the SRAM 306. The identification result information to be stored includes for example the denomination of the note, and the result of determination of authenticity.

In this embodiment, the main board 102 and the identification board 301 are separately configured. However, those two boards can be integrated into one single board.

Figure 4:
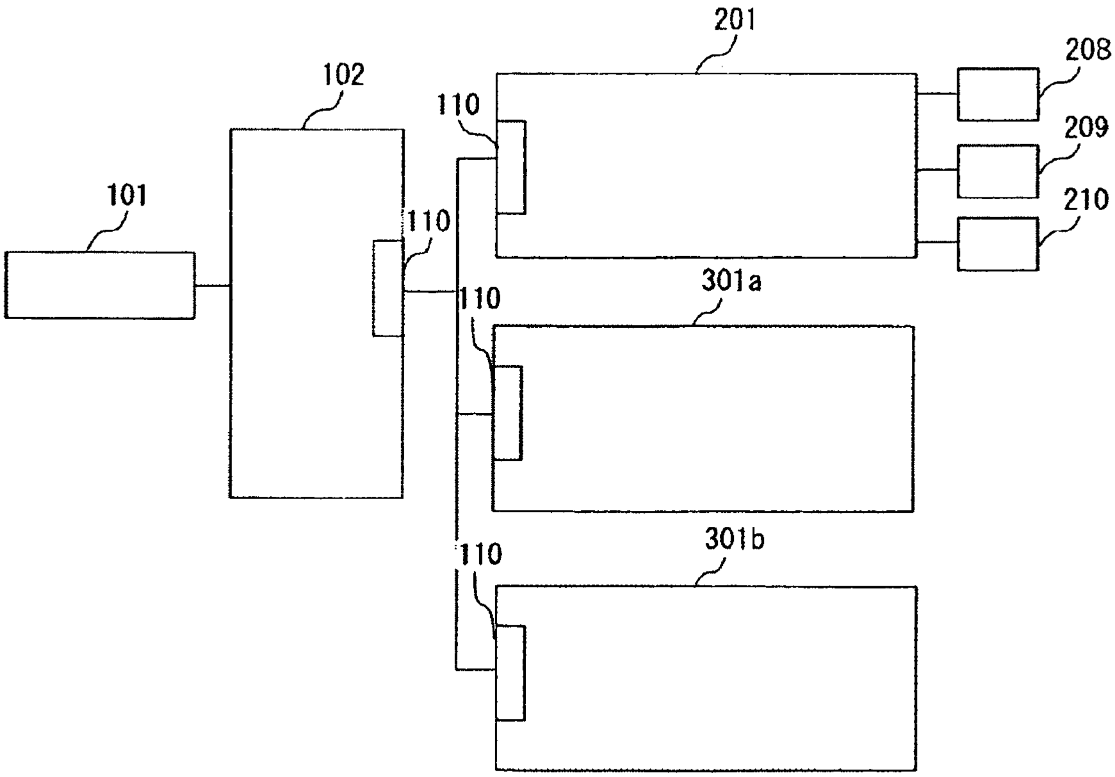
FIG. 4 is a schematic diagram illustrating the configuration of another identification device in accordance with the preferred embodiment of the present invention.

Now referring to FIG. 4, there is shown a schematic diagram of a paper sheet identifier device having the main board 102 connected to the sensor board 201, identification board 301*a* and identification board 301*b*. The identification boards 301*a*, 301*b* are configured identical to the identification board 301 described with reference to FIG. 3, and the circuit on those boards will be described using the same reference numbers described in FIG. 3.

Figure 5:
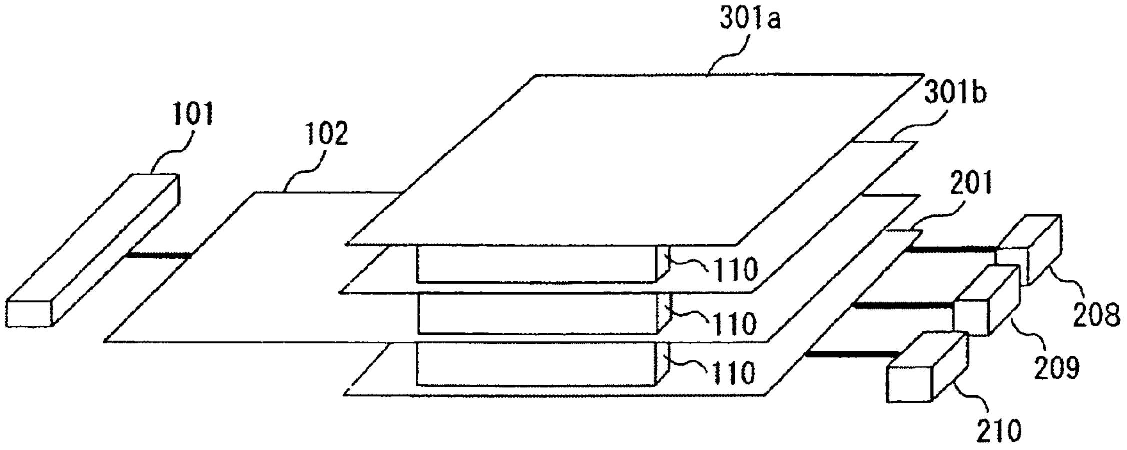
FIG. 5 is a perspective view of an identification device in accordance with the preferred embodiment of the present invention.

Now referring to FIG. 5, there is shown a perspective view of the paper sheet identifier device shown in FIG. 4. The interface signal for connecting the main board 102 with the sensor board 201, and the identification boards 301*a*, 301*b* is common in every board, so that boards can be stacked as shown in FIG. 5 by means of a plurality of connectors 110 of the same specification. The order of stacking the identification boards 301*a*, 301*b* and the sensor board 201 can be arbitrary with respect to the main board 102. In addition, the identification boards 301*a*, 301*b* can be swapped.

In this preferred embodiment, the main board 102, the sensor board 201, and the identification board 301 are separately configured. However, these two boards can be integrated into one single board, with the type and number of mounted elements altered.

Figure 6:
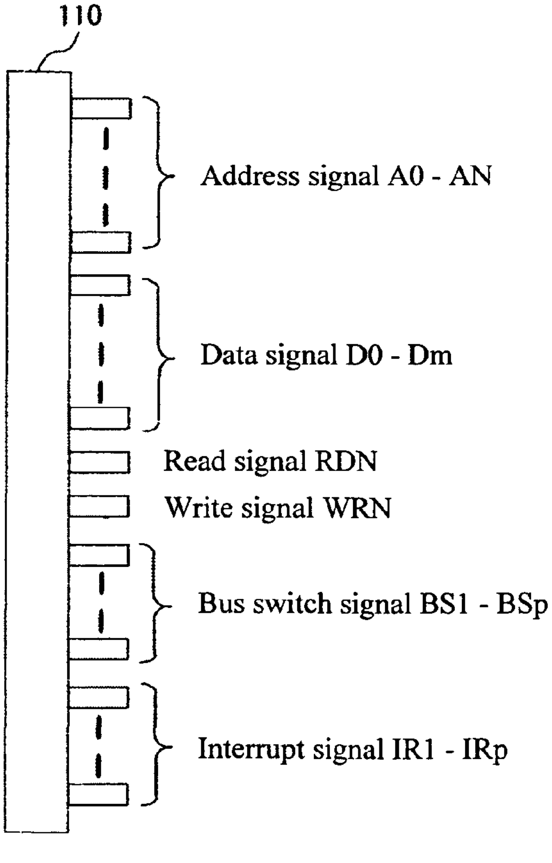
FIG. 6 is a schematic diagram illustrating the layout of a connector between boards.

Now referring to FIG. 6, there is shown an exemplary interface signal through the connector 110. The address signal A0 to An, data signal D0 to Dm, read signal RDN, write signal WRN are signals for reading and writing data for the addresses on the SRAM 206 and the SRAM 306 on the sensor board and identification board. The bus switch signals BSI to BSp are signals for switching the switches 205 and 305 on the sensor board 201 and the identification board 301, respectively. The interrupt signal IRO to IRp are signals for connecting interrupt signals from the sensor LSI 202 on the sensor board to the CPU 104 on the main board, and interrupt signals from the image processing LSI 106 on the main board to the CPU 303 on the identification board.

Figure 7:
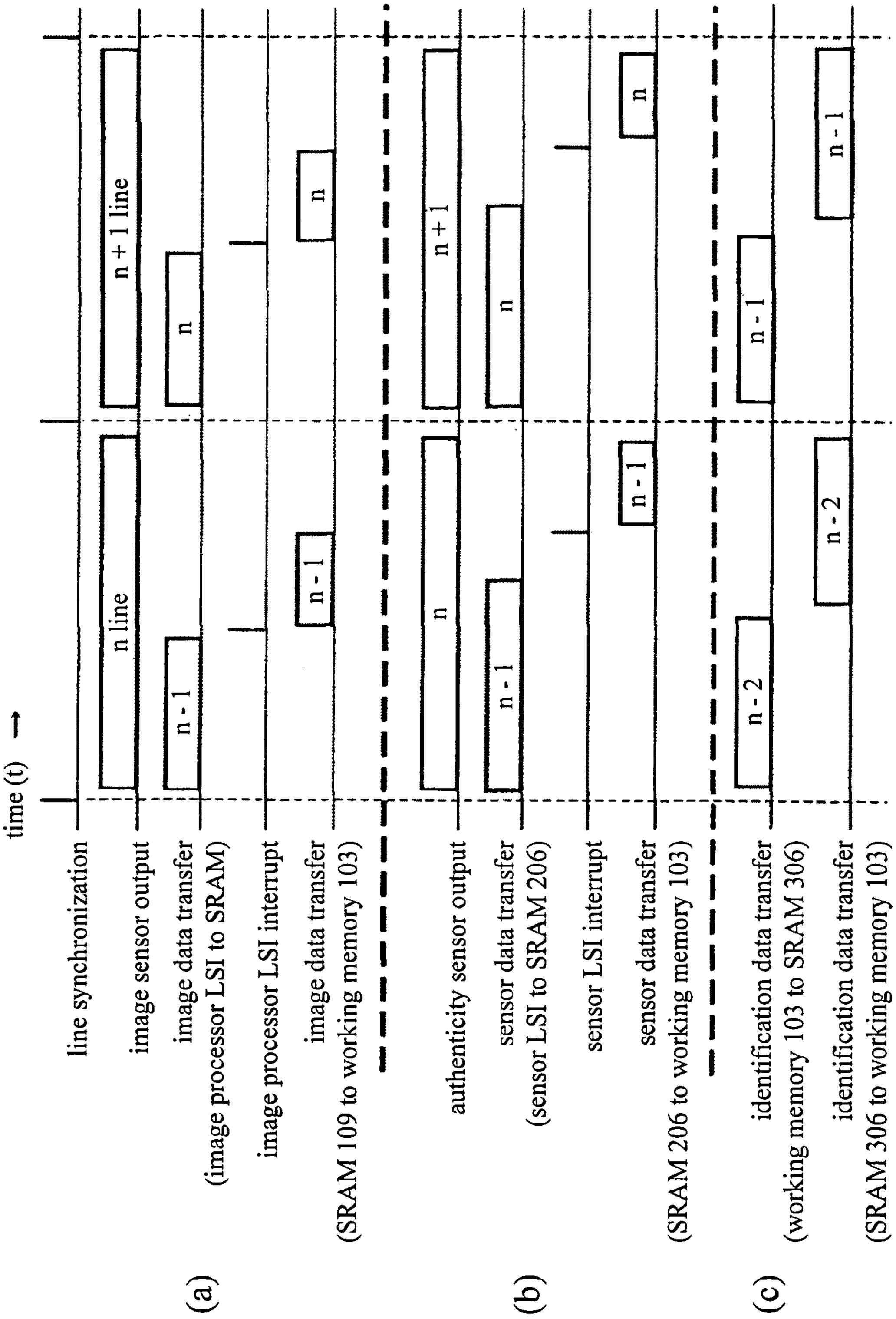
FIG. 7 is a schematic diagram illustrating the operation of the present invention (data flow for a scan line)

The operation timing chart for one scan line of cross feed direction in the paper sheet identifier device shown in FIG. 4 is shown in FIG. 7.

Now the main board 102 will be described. The operation timing chart of the main board 102 is shown in FIG. 7 (*a*). The image sensor 101 captures image data for one scan line of cross feed direction to obtain the surface image of a currency note, the operation of image sensor 101 is controlled by the line synchronization signal output from the image processing LSI 106. The image processing LSI 106 retrieves the image data of one preceding scan line from the line memory 107 to perform image processing, and stores the image processing result for one scan line into the SRAM 109 through the switch 108. When the final pixel data of one scan line has been stored, the image processing LSI 106 issues an interrupt signal for notifying the CPU 104 of the completion of image processing. The CPU 104, in turn, upon reception of the interrupt, will read out the image processing result from the SRAM 109 through the switch 108 to transfer the image to the working memory 103.

Now the sensor board 201 will be described. The operation timing chart of the sensor board 201 is shown in FIG. 7 (*b*). Each of the sensors 208, 209, and 210 captures the characteristics for one scan line of main scan direction for determining the authenticity of a currency note, in accordance with the line synchronization signal output from the image processing LSI 106. The sensor LSI 202 operates on the sensor data of just one preceding scan line to store the result into the SRAM 206 through the analog switch 205 for each scan line. When the final sensor data of one scan line has been stored, the sensor LSI 202 issues an interrupt to the CPU 104 on the main board 102 for notifying the CPU 104 of the completion of sensor operation. The CPU 104, in turn, upon reception of the interrupt, will read the operation results from the SRAM 206 through the analog switch 205 to transfer data to the working memory 103 on the main board 102.

Now the identification boards 301*a*, 301*b* will be described. The operation timing chart is shown in FIG. 7 (*c*). During the time when the image processing LSI 106 on the main board 102 is storing the image processing results to the SRAM 109, the CPU 104 transfers the data for identification from the working memory 103 to the SRAM 306 on the identification boards 301*a*, 301*b*. Next, upon reception of the interrupt notifying the completion of image processing from the image processing LSI 106, the CPU 303 on the identification boards 301*a*, 301*b* will transfer the data for identification stored in the SRAM 306 into the working memory 302, during the time when the CPU 104 on the main board 102 transfers the image data from the SRAM 109 to the working memory 103.

Figure 8:
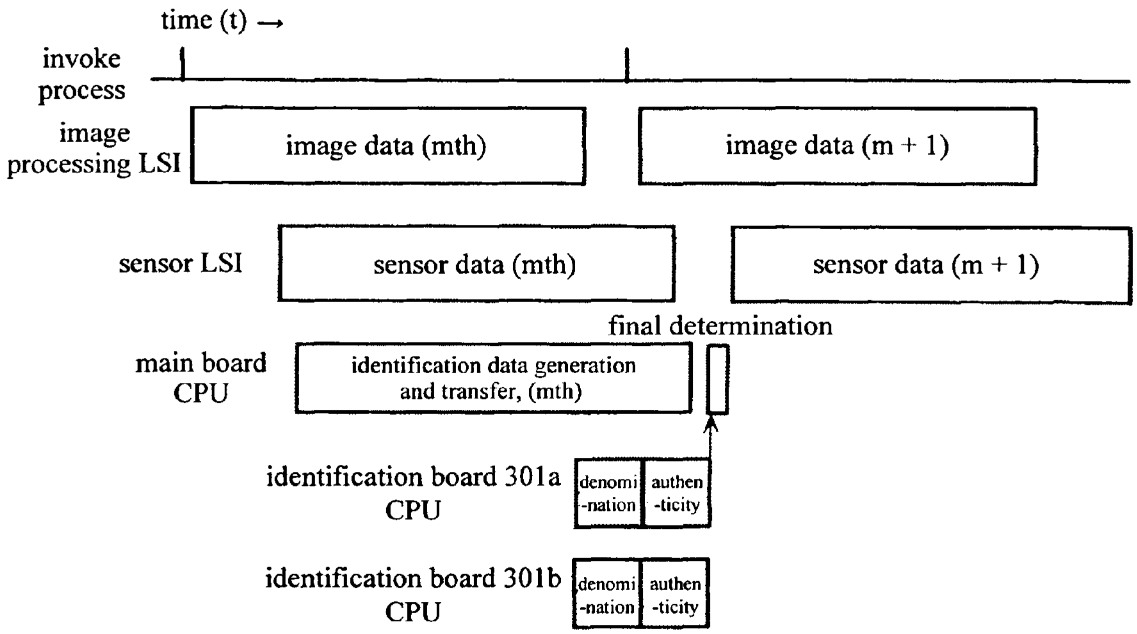
FIG. 8 is a schematic diagram illustrating the operation of the present invention (process for one note).

Now the operation of image processing LSI, sensor LSI and CPUs in the circuitry shown in FIG. 4 will be described with reference to the timing chart of FIG. 8. The CPU 104 on the main board 102 generates the identification data required for the determination of denomination and authenticity of the input note, based on the image data output from the image processing LSI 106 along with the sensor data output from the sensor LSI 202, and stores the data to the SRAM 306 on the identification boards 301*a*, 301*b*. When the complete data for one note required for the determination of denomination has been stored on the SRAM 306, the CPUs 303 on the identification boards 301*a*, 301*b* perform the determination processing of denomination in parallel processing. The identification programs stored in the program memory 304 on the identification boards 301*a*, 301*b* can identify different denominations, for example the CPU 303 on the identification board 301*a* may recognize the denomination and then authenticity of the notes in current circulation, while on the other hand the CPU 303 on the identification board 301*b* may recognize the denomination and then authenticity of the notes newly issued, in parallel. The determination results from those CPUs are notified to the CPU 104 on the main board 102 simultaneously. The notification process may be such that each CPU on the identification board independently writes the determination result in the address specified of the SRAM 306, and thereafter the CPU 104 on the main board 102 reads the data of the specified addresses of the memory on the identification boards. Thereafter the CPU 104 on the main board 102 will perform the final determination based on the determination results from the identification boards 301*a*, 301*b* to terminate the determination for one currency note.

In accordance with the preferred embodiment shown in FIG. 4, the paper sheet identifier device in accordance with the present invention may have the effect that it can add an additional identification board without updating the program or replacement of identification boards, when a new note is issued which contains a more complex scheme for authenticity identification, resulting in an improved efficiency of circulation of new notes. The paper sheet identifier device of the present invention may also have the effect that, since the main board 102 performs the common processing independent from the type and denomination of notes, while the different identification processes dependent on the notes can be executed in parallel, it allows the identification time to be saved, and the processing time can be maintained by adding more identification boards if there are many types and denomination of notes.

The transfer time can be shorten to the time required for the effective data when the CPU on the main board stores the output data from the image processing LSI into the memory while the image data and image processing result required for the identification are written into the memory of identification boards in parallel. When the image transfer to the memory of identification boards has been completed, each of CPUs is allowed performing identification processing in parallel and independently.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A paper sheet identifier device, comprising:

a sensor for detecting necessary characteristics of a paper sheet required for identifying said paper sheet;

a sensor board on which a characteristics information collector unit is mounted, said characteristics information collector unit for converting the output signal from said sensor to the characteristics information of said paper sheet;

an identification board on which an identifying unit is mounted, said identifying unit being for identifying said paper sheet by using the characteristics information output from said characteristics information collector unit; and a main board on which a controller unit is mounted, said controller unit being for controlling said characteristics information collector unit and said identifying unit, wherein at least one of said sensor board and said identification board is removably connected to said main board.

2. A paper sheet identifier device according to claim 1, wherein:

said characteristics information collector unit and said identification unit have each memory element, and said characteristics information collector unit and said identification unit perform transmission and reception of signals to and from said controller unit via said memory element.

3. A paper sheet identifier device according to claim 1, wherein said controller unit further comprises:

a storage means for storing image data obtained by an image sensor for capturing image of said paper sheet;

a data processor means for processing said image data; and a CPU means for controlling said data processor means;

wherein writing of one scan line of image data from said data processor means and reading of one scan line of image data of from said CPU to and from said storage means are performed in a time sharing system basis, while capturing one scan line of image data by said image sensor.

4. A paper sheet identifier device according to claim 3, wherein:

in synchronization with the start signal of image data scan for one scan line by said image sensor, said CPU is controlled in the time sharing system basis such that said data processor means writes the one scan line of image data to said storage means, prior to reading of one scan line of image data by said CPU.

5. A paper sheet identifier device according to claim 1, further comprising:

a plurality of identifying units mounted on identification boards respectively, each identifying unit identifying a different type of paper sheet; and a storage means provided in said controller unit for storing image data obtained by said image sensor for capturing image of said paper sheet;

wherein the same image data stored in said storage means is transmitted to said plurality of identifying units, and said plurality of identifying units performs simultaneously identification process in parallel.

6. A paper sheet identifier device according to claim 5, further comprising:

a CPU and a respective storage means for identification for said CPU provided for each of said plurality of identifying units;

wherein said plurality of identification units store the image data of paper sheet transferred from said controller unit into said storage means for identification, then the CPUs of said identification units read out the image data from the respective storage means for identification and performs identification process in parallel in said plurality of identification units.

7. A paper sheet identifier device according to claim 5, wherein:

said controller unit accumulates the identification result data provided by said plurality of identification units to perform a final distinguishment.

8. A paper sheet identifier device according to claim 1, wherein:

said controller unit includes a CPU, a first storage means and a second storage means;

said CPU transfers image data from the first storage means to the second storage means in synchronization with the scan line of image; and after having transferred the image data of one sheet, said CPU reads out the image data stored in the second storage means for performing the identification process.

9. A paper sheet identifier device according to claim 8, further comprising:

a plurality of identifying units mounted on boards respectively, each identifying unit having a CPU and a storage means for identification, wherein: image data is transferred from the first storage means to the second storage means of said controller unit for each scan line in a time sharing system basis, while image data is transferred to the storage means for identification in said plurality of identifying units; and wherein said plurality of identifying units perform independently the identification process of paper sheet after having one sheetful of image data.

10. A paper sheet identifier device according to claim 1:

wherein said sensor board and said identification are each equipped with a same connector for connecting to said main board.

11. A paper sheet identifier device according to claim 10, wherein: each of said main board, said sensor board and said identification board having a same connector respectively; and said sensor board and said identification board are stacked on said main board by using said connector.

* * * * *